US010776554B1

(12) United States Patent
Tzeng et al.

(10) Patent No.: US 10,776,554 B1
(45) Date of Patent: Sep. 15, 2020

(54) SIBLING WIRE ROUTING

(71) Applicant: Avatar Integrated Systems, Inc., Santa Clara, CA (US)

(72) Inventors: Ping-San Tzeng, Fremont, CA (US); Mingsheng Han, Fremont, CA (US)

(73) Assignee: Avatar Integrated Systems, Inc., Santa Clara, CA (US)

( * ) Notice: Subject to any disclaimer, the term of this patent is extended or adjusted under 35 U.S.C. 154(b) by 0 days.

(21) Appl. No.: 16/100,097

(22) Filed: Aug. 9, 2018

(51) Int. Cl.
*G06F 30/394* (2020.01)
*G06F 30/327* (2020.01)
*G06F 30/398* (2020.01)
*G06F 111/20* (2020.01)

(52) U.S. Cl.
CPC .......... *G06F 30/394* (2020.01); *G06F 30/327* (2020.01); *G06F 30/398* (2020.01); *G06F 2111/20* (2020.01)

(58) Field of Classification Search
CPC ...... G06F 30/392; G06F 30/394; G06F 30/33; G06F 30/30; G06F 2115/08; G06F 30/39; G06F 30/398; G06F 30/327; G06F 2117/06; G06F 2119/12; G06F 30/396; G06F 2119/06; G06F 30/367; G06F 2111/04; G06F 2113/18; G06F 2119/18; G06F 30/3312; G06F 30/00; G06F 30/36; G06F 9/455; H01L 24/02; H01L 24/06; H01L 27/11807; H01L 2924/14; H01L 2924/3011; H01L 2924/3025; C40B 40/02
USPC .................................. 716/100–106, 118–125
See application file for complete search history.

(56) References Cited

U.S. PATENT DOCUMENTS

| 2007/0106969 A1* | 5/2007 | Birch ..................... G06F 30/394 716/113 |
| 2008/0077900 A1* | 3/2008 | Oh .......................... G06F 30/33 716/114 |
| 2009/0199142 A1* | 8/2009 | Arunachalam ..... G06F 17/5072 716/132 |
| 2009/0313596 A1* | 12/2009 | Lippmann ............. G06F 17/505 716/126 |
| 2011/0055791 A1* | 3/2011 | Gao ....................... G06F 30/392 716/131 |
| 2011/0167399 A1* | 7/2011 | Schroeder ........... G06F 17/5045 716/122 |

\* cited by examiner

*Primary Examiner* — Binh C Tat
(74) *Attorney, Agent, or Firm* — Van Pelt, Yi & James LLP (57) ABSTRACT

A placed netlist is routed. A circuit is obtained that implements the placed netlist. A net in the circuit is identified to be enhanced. Space adjacent to a wire associated with the net that would accommodate a parallel wire is reserved.

18 Claims, 10 Drawing Sheets

| edit_property | |
|---|---|
| Object_class: | via |
| mask: | cut 1_2 |
| via_cell_num: | 102 ▶ |
| via_cell_name: | VIA12_8.5_10_30_0 ▶ |
| via_name: | VIA12_8.5_10_30_0_562 ▶ |
| data_type: | 0 |
| cut_photo_mask: | 0 ▶ |
| lower_photo_mask: | 1 ▶ |
| upper_photo_mask: | 1 ▶ |
| number_of_rows: | 1 |
| number_of_columns: | 1 ▶ |
| lower_sibling: | 0_sibling ▶ — 622 |
| upper_sibling: | 1_sibling ▶ — 624 |
| orientation: | R0 ▶ |
| loc: | x: 514.254   y: 493.3 ▶ |
| route_type: | sig |
| net_name: | u_fcr_top/u_CKLNQD12BWP240H8P57PDULVT_ATctodp_103492_4 |
| net: | u_fcr_top/u_CKLNQD12BWP240H8P57PDULVT_ATctodp_103492_4 |
| bbox: | x1: 514.214  y1: 493.28  x2: 514.294  y2: 493.36 |
| upper_bbox: | x1: 514.214  y1: 493.29  x2: 514.294  y2: 493.35 |
| lower_bbox: | x1: 514.2355  y1: 493.28  x2: 514.2725  y2: 493.36 |
| yield: | 1 |
| conn_pt: | x: 514.254  y: 493.3 | via of net u_fcr_top/u_

SIBLING WIRE ROUTING

BACKGROUND OF THE INVENTION

Semiconductor process technology has advanced rapidly from 10 μm process in the 1970s to 7 nm process in current designs. Such advances in microelectronics reduce the feature size and increase process rule complexity for integrated circuit design. There is a need for design tools to address this increase in process rule complexity with automation to reduce burden for designers.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

One of the main purposes of a smaller process is to make a circuit run faster. Unfortunately, as the connecting wires and vias shrink, the signal delay due to electrical resistance and capacitance drastically increase, which slows down a circuit, and offsets the advantage of a smaller process. This becomes especially critical at 7 nm and below, as the traditional workaround technique of using wider wires are not practical because of process complexity. Improving the signal delay thus speeding up the circuit, without compromising the complex design rule restrictions at 7 nm and below, is disclosed.

Using sibling wire routing and/or sibling via placement for modern lower metal layers is disclosed. One aspect of modern microelectronics processes is a technique wherein lower metal layers are narrower than higher layers. Being narrower, wires in the lower metal layer are of higher electrical resistance in comparison the other wider wires in the higher layers. As is conventional, pins in a design are connected with the lower metal layers. As referred to herein, a via or vertical interconnect access is an electrical connection between layers of an integrated circuit, usually a small opening in an insulating oxide layer that allows a conductive connection between layers.

There are issues with having such narrow metal wires at driver pins, including a higher RC (resistive capacitive) delay because of the higher resistance resulting in a slower design, and electro-migration issues with a smaller current limit on narrower wires, causing permanent damage to a chip. For older processes, such as 10 nm and/or 16 nm and larger, a traditional technique is to arrange for a "wide wire" being twice or three times as wide in lower metal, and use bigger or multiple vias as well.

For newer processes such as 7 nm and below, the use of mixed size wires in lower layers is not practical because of complex process rules. Designers may use a workaround such as a via pillar, a manual stack of multiple vias from a driver pin to a higher metal layer in order to perform most routing on the higher layers. Issues with such workarounds include: inefficient routing resource, poor routing pattern, complexity in placement (as the pillars need to avoid other obstacles like power stripes), and complexity in workflow due to the need of updating via pillars with replacement or removal of cells, etc.

Instead of widening a wire which may no longer be allowed in modern processes, a technique of multiple wire and via routing is disclosed, as referred to herein as sibling routing. A sibling element is one or more parallel elements to reduce resistance and electromigration issues. For example, to access a high power driver pin, two parallel wires may be routed with multiple via connections for a single critical net. As referred to herein a "net" is an abstraction indicating a logical connection between components/pins. As referred to herein a "wire" is a physical description of the actual trace on an integrated circuit that implements an associated net. Design tools permitting a designer to indicate a critical net and/or automatically detecting a critical net and then introducing a sibling element "on the fly". Throughout this specification and without limitation, "on the fly" refers herein to creating when needed (for example a design tool creating a sibling element without necessarily engaging the designer) and/or changes made during the execution of a design tool ex tempore or impromptu (for example something that was not planned ahead by a designer.)

Figure 1:
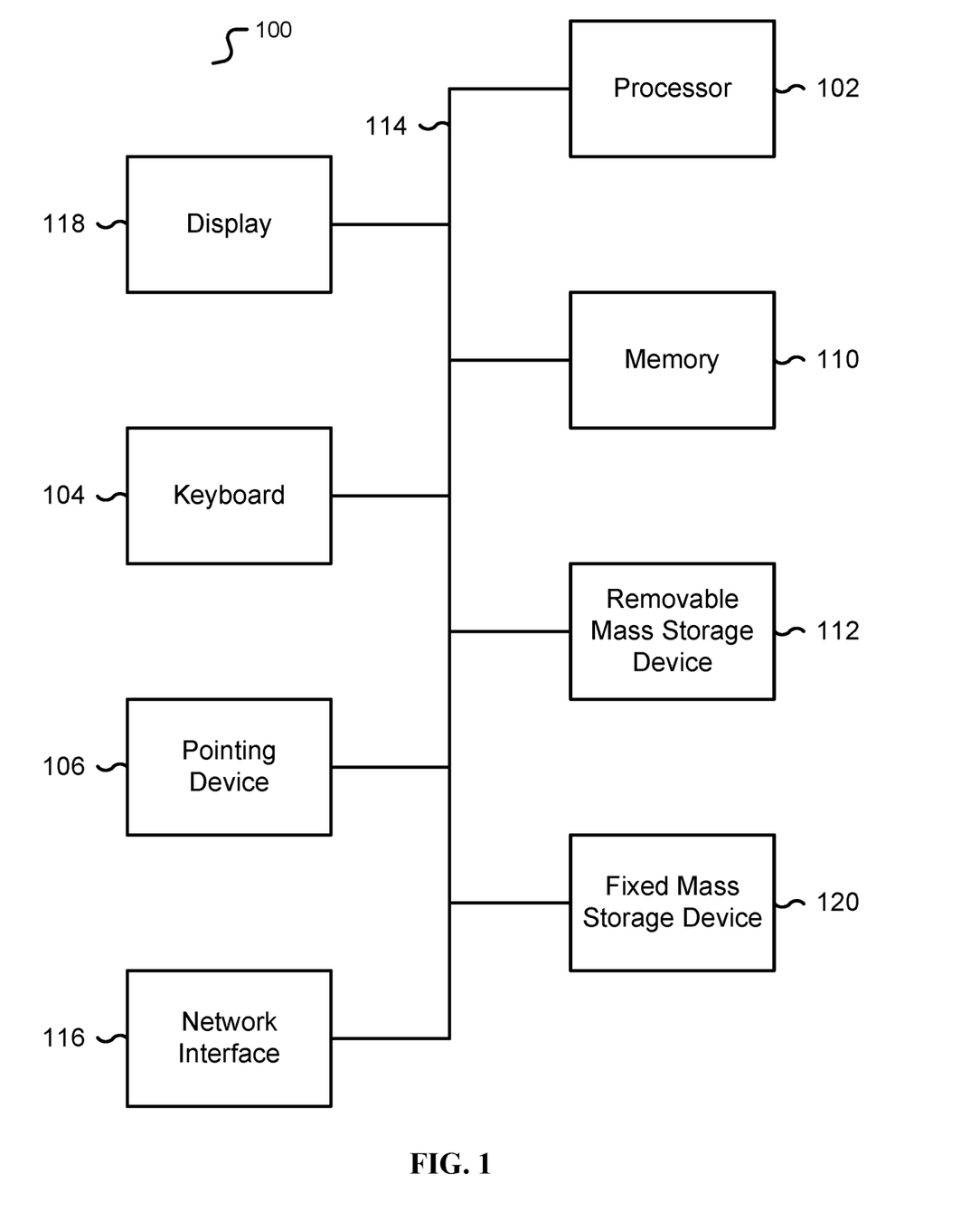
FIG. 1 is a functional diagram illustrating a programmed computer/server system for sibling wire routing and/or sibling via placement in accordance with some embodiments.

FIG. 1 is a functional diagram illustrating a programmed computer/server system for sibling wire routing and/or sibling via placement in accordance with some embodiments. As shown, FIG. 1 provides a functional diagram of a general purpose computer system programmed to provide sibling wire routing and/or sibling via placement in accordance with some embodiments. As will be apparent, other computer system architectures and configurations may be used for sibling wire routing and/or sibling via placement.

Computer system 100, which includes various subsystems as described below, includes at least one microprocessor subsystem, also referred to as a processor or a central processing unit ("CPU") (102). For example, processor (102) can be implemented by a single-chip processor or by multiple cores and/or processors. In some embodiments, processor (102) is a general purpose digital processor that controls the operation of the computer system 100. Using instructions retrieved from memory (110), the processor (102) controls the reception and manipulation of input data, and the output and display of data on output devices, for example display and graphics processing unit (GPU) (118).

Processor (102) is coupled bi-directionally with memory (110), which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor (102). Also as well known in the art, primary storage typically includes basic operating instructions, program code, data, and objects used by the processor (102) to perform its functions, for example programmed instructions. For example, primary storage devices (110) can include any suitable computer-readable storage media, described below, depending on whether, for example, data access needs to be bi-directional or uni-directional. For example, processor (102) can also directly and very rapidly retrieve and store frequently needed data in a cache memory, not shown. The processor (102) may also include a coprocessor (not shown) as a supplemental processing component to aid the processor and/or memory (110).

A removable mass storage device (112) provides additional data storage capacity for the computer system 100, and is coupled either bi-directionally (read/write) or uni-directionally (read only) to processor (102). For example, storage (112) can also include computer-readable media such as flash memory, portable mass storage devices, holographic storage devices, magnetic devices, magneto-optical devices, optical devices, and other storage devices. A fixed mass storage (120) can also, for example, provide additional data storage capacity. One example of mass storage (120) is an eMMC or microSD device. In one embodiment, mass storage (120) is a solid-state drive connected by a bus (114). Mass storage (112), (120) generally store additional programming instructions, data, and the like that typically are not in active use by the processor (102). It will be appreciated that the information retained within mass storage (112), (120) can be incorporated, if needed, in standard fashion as part of primary storage (110), for example RAM, as virtual memory.

In addition to providing processor (102) access to storage subsystems, bus (114) can be used to provide access to other subsystems and devices as well. As shown, these can include a display monitor (118), a communication interface (116), a touch (or physical) keyboard (104), and one or more auxiliary input/output devices (106) including an audio interface, a sound card, microphone, audio port, audio recording device, audio card, speakers, a touch (or pointing) device, and/or other subsystems as needed. Besides a touch screen and/or capacitive touch interface, the auxiliary device (106) can be a mouse, stylus, track ball, or tablet, and is useful for interacting with a graphical user interface.

The communication interface (116) allows processor (102) to be coupled to another computer, computer network, or telecommunications network using a network connection as shown. For example, through the communication interface (116), the processor (102) can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor (102) can be used to connect the computer system 100 to an external network and transfer data according to standard protocols. For example, various process embodiments disclosed herein can be executed on processor (102), or can be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, TCP/IP, intranet, local-area network ("LAN"), home-area network ("HAN"), serial connection, parallel connection, wide-area network ("WAN"), Fibre Channel, PCI/PCI-X, AGP, VLbus, PCI Express, Express-card, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor (102) through communication interface (116).

An auxiliary I/O device interface, not shown, can be used in conjunction with computer system 100. The auxiliary I/O device interface can include general and customized interfaces that allow the processor (102) to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 1 is but an example of a computer system suitable for use with the various embodiments disclosed herein. Other computer systems suitable for such use can include additional or fewer subsystems. In addition, bus (114) is illustrative of any interconnection scheme serving to link the subsystems. Other computer architectures having different configurations of subsystems may also be utilized.

Figure 2A:
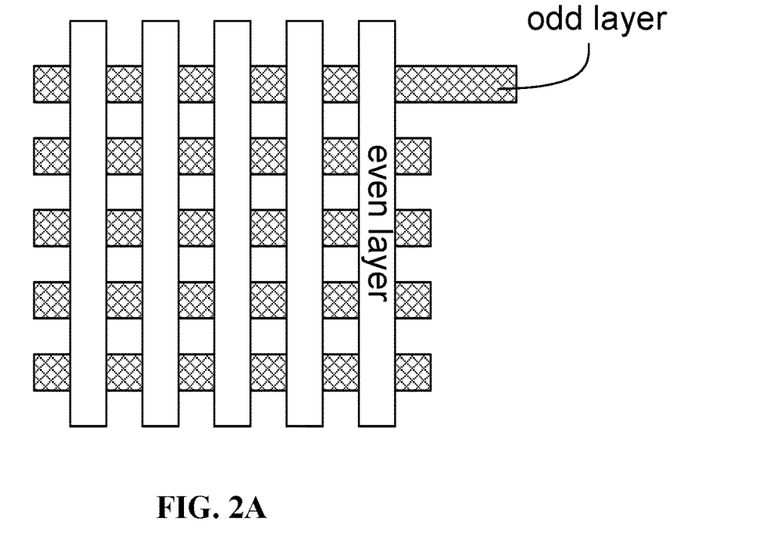
FIG. 2A is an illustration of modern process design rules.

FIG. 2A is an illustration of modern process design rules. As shown in FIG. 2A, with 7 nm and smaller process a regular structure is enforced via design rules, for example, having all wires of equal width and equal spacing, and setting wires all of the same direction for an odd layer and/or even layer.

Figure 2B:
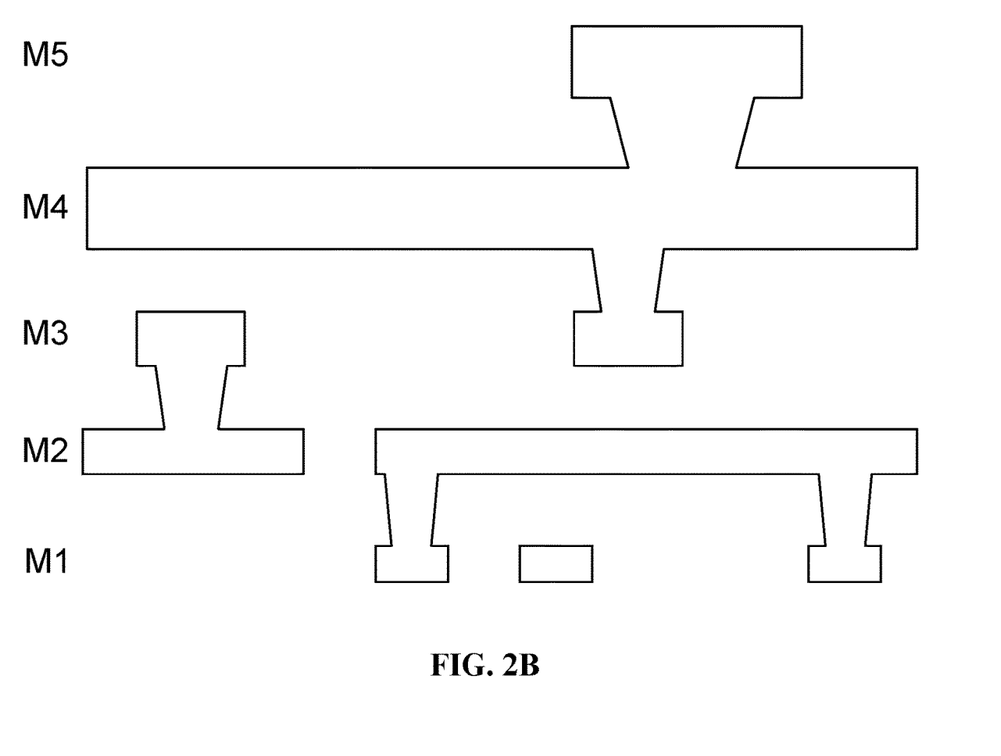
FIG. 2B is an illustration of a modern process design cross-section.

FIG. 2B is an illustration of a modern process design cross-section. A cross-section shows both wires as well as vias, illustrated by a connection between two layers. As shown in FIG. 2B, a lower metal layer M1 has narrower metal wires in comparison to higher metal layer M3 which may be narrower again in comparison to yet-higher metal layer M5.

Figure 2C:
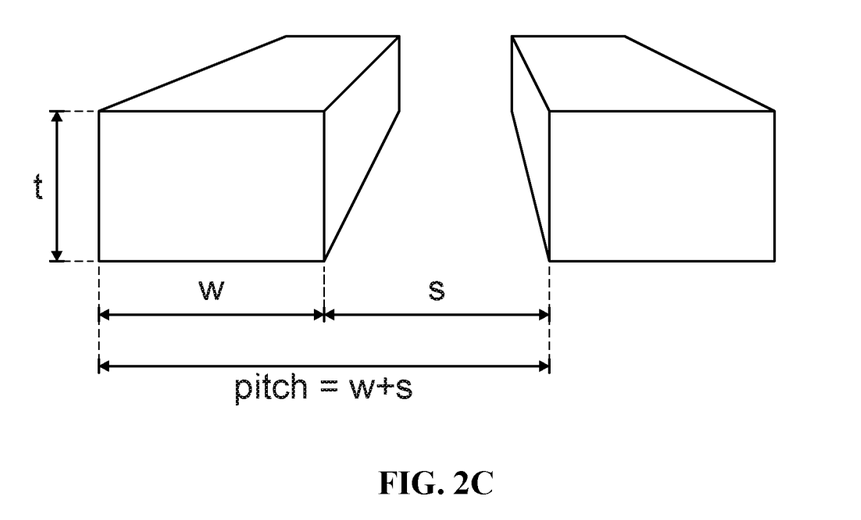
FIG. 2C is a perspective illustration of a metal layer.

FIG. 2C is a perspective illustration of a metal layer. As shown in FIG. 2C, a wire has a thickness t as well as width w corresponding to the process, for example 7 nm. The wire is also spaced s such that the wire pitch is the sum of the width w and space s.

Figure 2D:
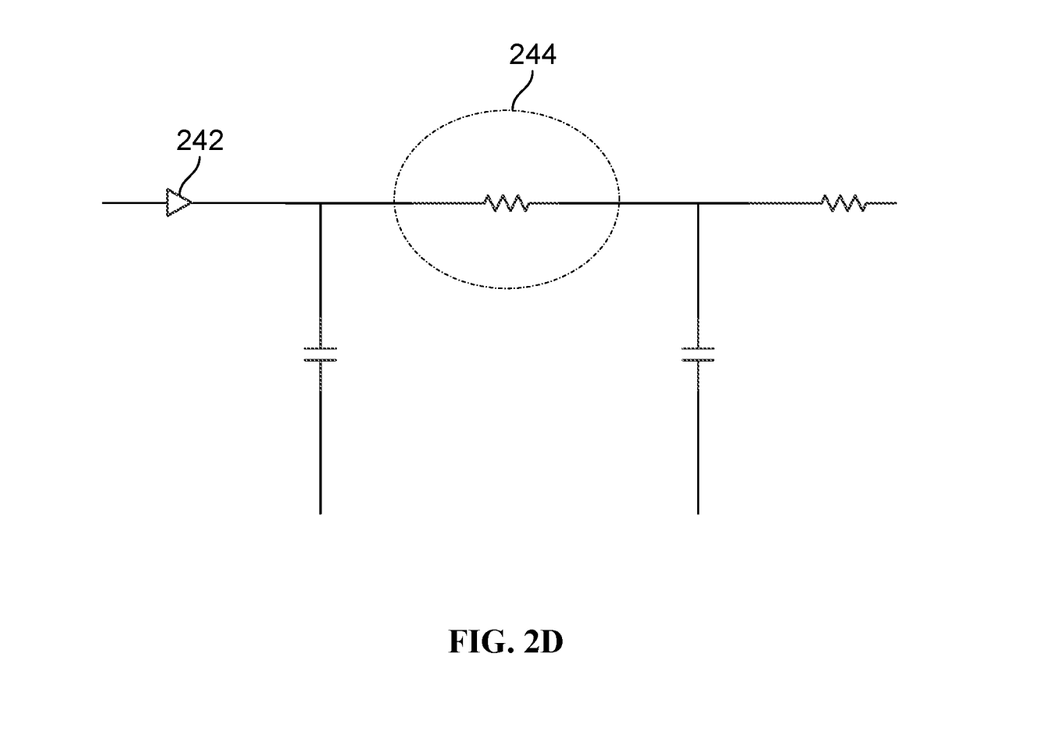
FIG. 2D is an electrical schematic of an equivalent circuit for a driver.

FIG. 2D is an electrical schematic of an equivalent circuit for a driver. As shown in FIG. 2D, an abstraction circuit equivalence includes, from the perspective of a driver (242), a network of capacitors and resistors, of which the resistance from a metal wire (244) is a part of. As the metal wire represented by resistor (244) is made relatively more narrow, the resistance (244) increases.

Figure 3:
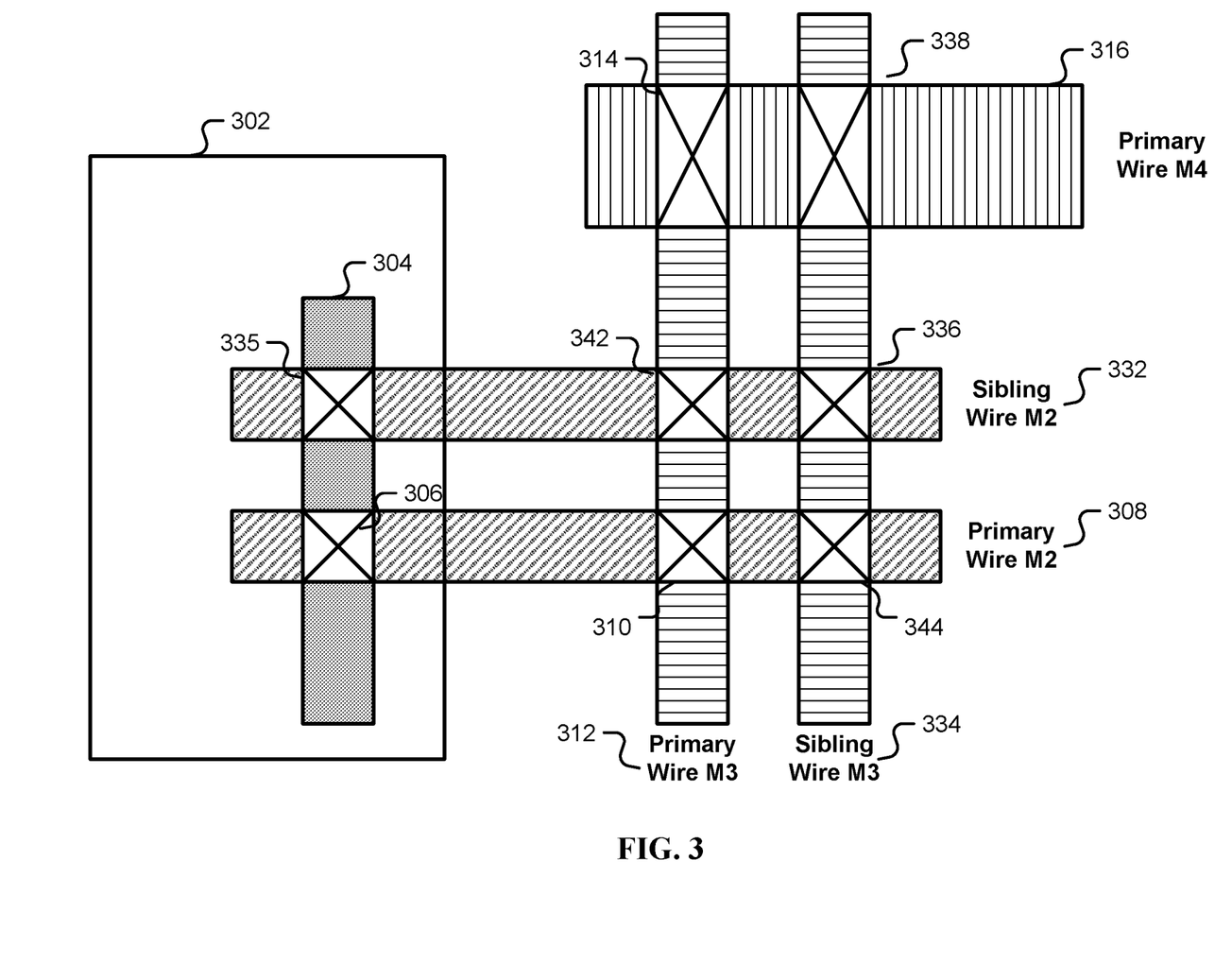
FIG. 3 is a top-down perspective of a sibling entity.

FIG. 3 is a top-down perspective of a sibling entity. In one embodiment, the top-down perspective of FIG. 3 may look similar to FIG. 2B from the side. As referred to herein, an integrated circuit design 'entity' may include without limitation a component, a device, a driver, a stripe, a ring, a wire, and a via.

Driver (302) is to be routed from an M1 level metal wire (304) to another cell using a higher level M4 level metal wire (316). In FIG. 3, M1 level wires are shown shaded solid grey. Thus M1 level metal wire (304) uses a via (306) to connect to a primary wire on the M2 level (308), wherein in FIG. 3 all M2 level wires are shown diagonally crosshatched. The M2 level wire (308) uses a via (310) to connect to a primary wire on the M3 level (312), wherein in FIG. 3 all M3 level wires are shown horizontally crosshatched. The M3 level wire (312) uses a via (314) to connect to M4 level wire (316), wherein in FIG. 3 all M4 level wires are shown vertically crosshatched. Also, as shown in FIG. 3, by way of example M4 level wires are shown to be wider than M1-M3 wires. Without limitation, the term "primary" and "sibling" for wires are used for convenience of illustration, as the wires are electronically equivalent and may be implemented in various ways.

In one embodiment, it is indicated to the design tool that the above-described net is a critical net, for example because of timing or because of current limiting/electromigration issues. For example, the designer may explicitly indicate to the design tool it is a critical net. Another example is that the design tool automatically audits nets and determines based on an audit that the net is a critical net without the need for a designer to explicitly indicate it is critical.

After obtaining the circuit that implements the placed netlist, and after identifying a net in the circuit that is to be enhanced, space is reserved adjacent to a wire associated with the net, for example primary wire M2 (308) that would accommodate a parallel wire such as sibling wire M2 (332), shown not only reserved in space but also routed in FIG. 3. Similarly, sibling wire M3 (334) is also reserved/routed.

Beyond sibling wires, sibling vias may also be implemented. Not only are vias routed for the sibling wire M2 (332) such as sibling via (335), sibling via (336), and sibling via (338) along the new wires, but sibling vias may also be connected to primary wires such as sibling via (344) connecting primary wire M2 (306) with sibling wire M3 (334) and sibling via (342) connecting primary wire M3 (312) with sibling wire M2 (332).

Figure 4A:
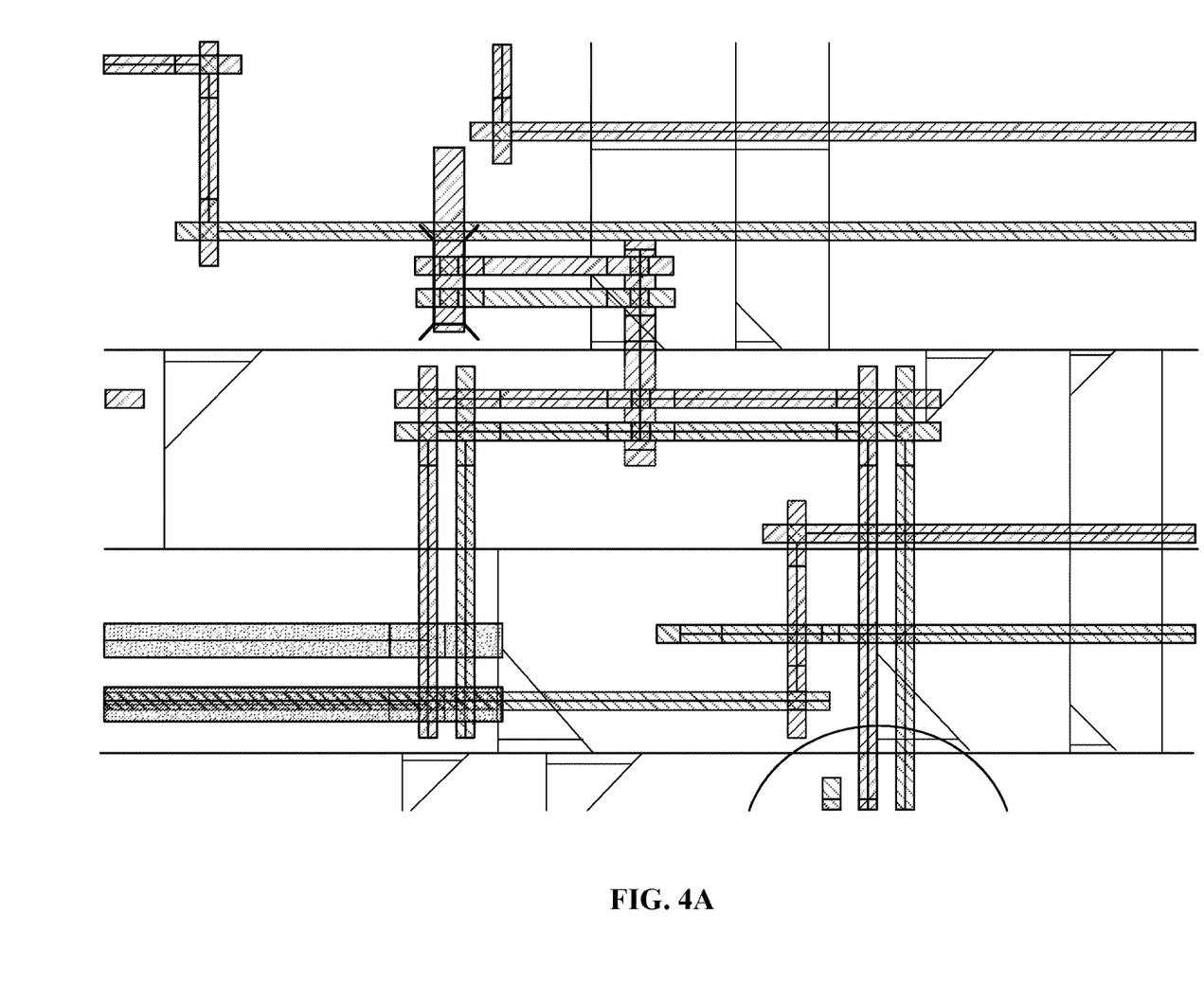
FIG. 4A is an illustration showing how sibling patterns look in a graphical user interface (GUI) for a design tool.
Figure 4B:
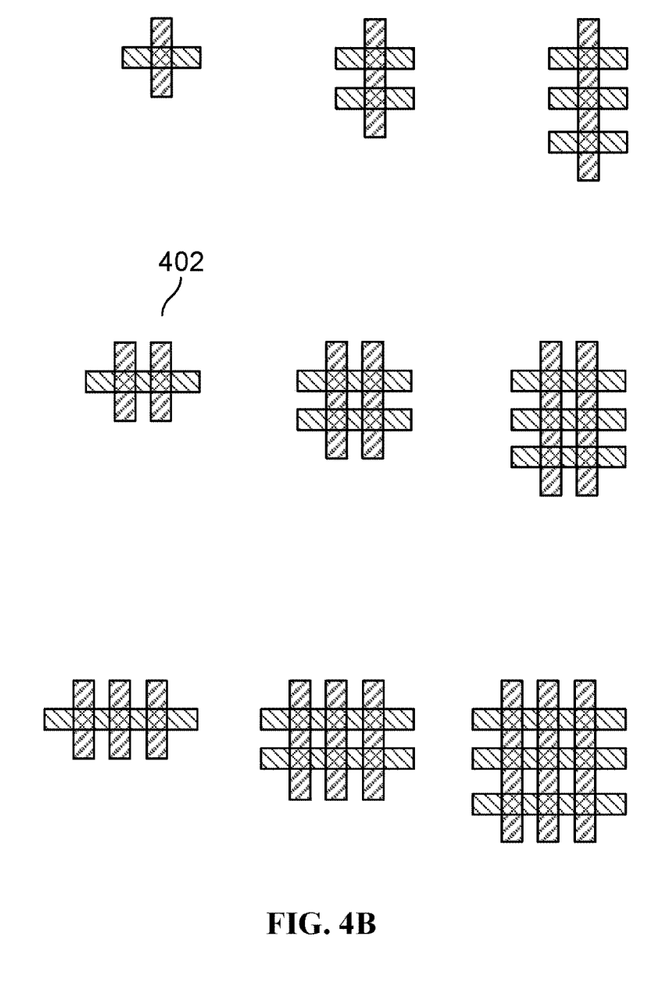
FIG. 4B is an illustration showing different permutations for sibling via patterns without limitation including 1×2 vias, 1×3 vias, 2×1 vias, 2×2 vias, 2×3 vias, 3×1 vias, 3×2 vias, and 3×3 vias.

FIG. 4A is an illustration showing how sibling patterns look in a graphical user interface (GUI) for a design tool. FIG. 4B is an illustration showing different permutations for sibling via patterns without limitation including 1×2 vias, 1×3 vias, 2×1 vias, 2×2 vias, 2×3 vias, 3×1 vias, 3×2 vias, and 3×3 vias. In one embodiment, more than three siblings may also be represented, for example 4×4 vias and 5×5 vias.

Figure 4C:
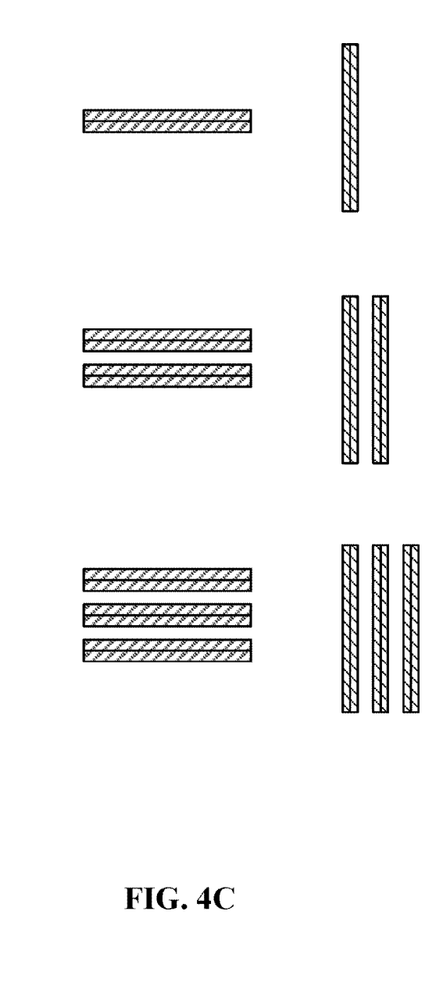
FIG. 4C is an illustration showing how sibling wire patterns look in a GUI for a design tool.

FIG. 4C is an illustration showing how sibling wire patterns look in a GUI for a design tool. FIG. 4C is an illustration showing different permutations for sibling wires without limitation including 1 horizontal wire, 2 horizontal wires, 3 horizontal wires, 1 vertical wire, 2 vertical wires, and 3 vertical wires. In one embodiment, more than three sibling wires may also be represented, for example 4 wires and 5 wires.

Figure 5:
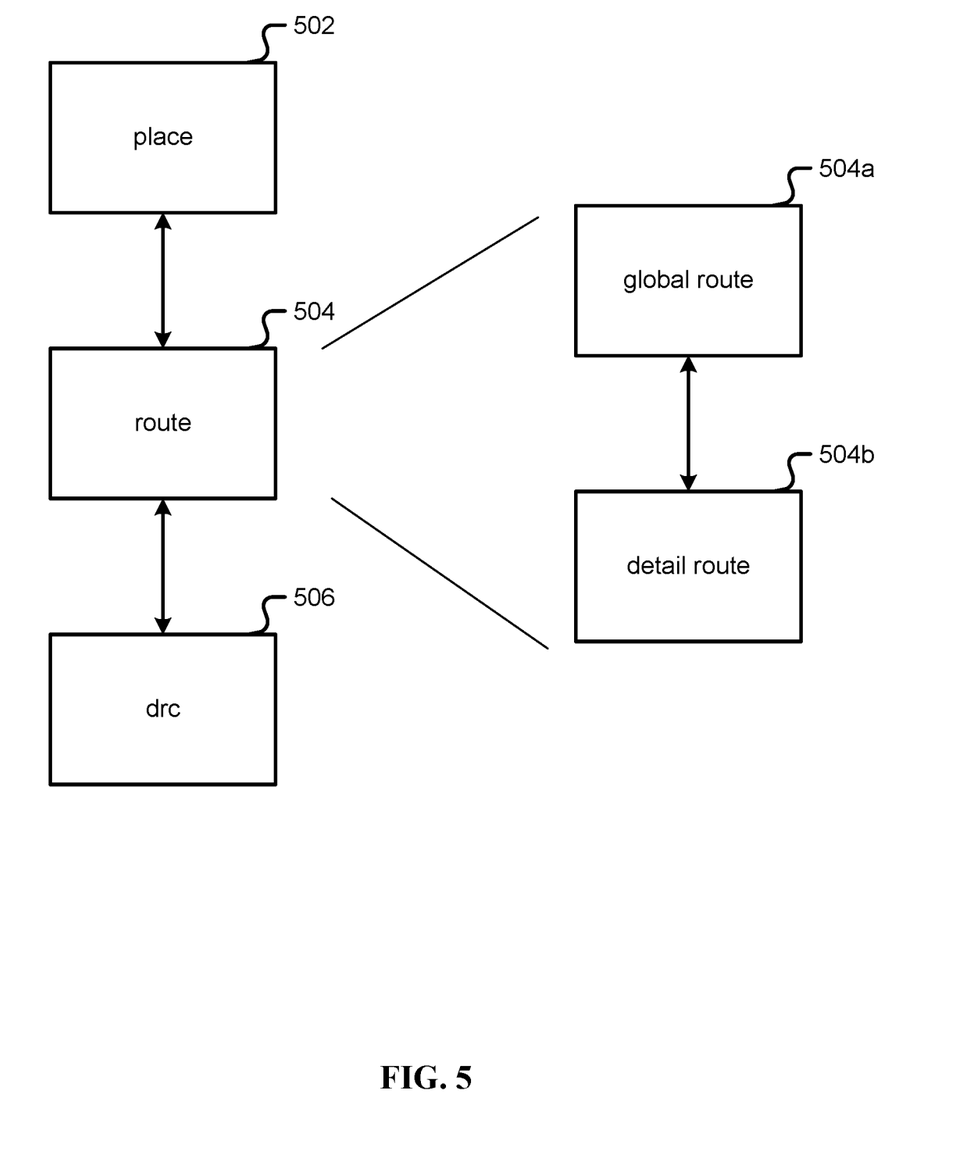
FIG. 5 is a block diagram illustrating an embodiment of a workflow for integrated circuit design.

FIG. 5 is a block diagram illustrating an embodiment of a workflow for integrated circuit design. In one embodiment, the workflow in FIG. 5 is carried out by a system as shown in FIG. 1 and/or using a design tool.

In step (502), components such as devices and drivers are placed. Nets may be indicated during this stage. In one embodiment, during placement a designer may indicate a need that one or more nets associated with a specified component would require enhanced routing. For older process, for example 10 nm and/or 16 nm process, this may involve a double-width wire. For modern process, for example 7 nm process, this may including sibling entity placement and routing. In one embodiment, the system may indicate a need for a specified component would require enhanced routing because of one or more reasons, including a result of a previously run design rule check (DRC) or because of an initial audit and/or scan.

In step (504), nets are routed. Nets may be indicated during this stage. There are at least two substages to routing; step (504a) is a global routing step that performs an overall routing of wires across a large physical area/context of the integrated circuit; and step (504b) is a detailed routing step that performs a tighter switch-box (or s-box) area of routing optimization to address timing and/or current issues. With sibling wire routing, paths are reserved for two or more parallel wires for nets to be enhanced. After the routing step a DRC step (506) evaluates the placement and routing and flags any DRC violations within a switch-box or globally. If no violations occur and/or it is approved after routing process, GDS (Graphical Design System, including GDSII) layout may be output.

In one embodiment, sibling wires and/or sibling vias are not immediately rendered to polygons during place and routing. Retaining a compacted representation instead allows a designer to avoid being bogged down by enhanced nets. A philosophy of "just in time" rendering thus permits faster iteration and lower memory requirements while in the workflow of placement (502), route (504), and DRC (506) when a compacted representation is used, before a final rendering and/or derivation to polygon.

Figure 6A:
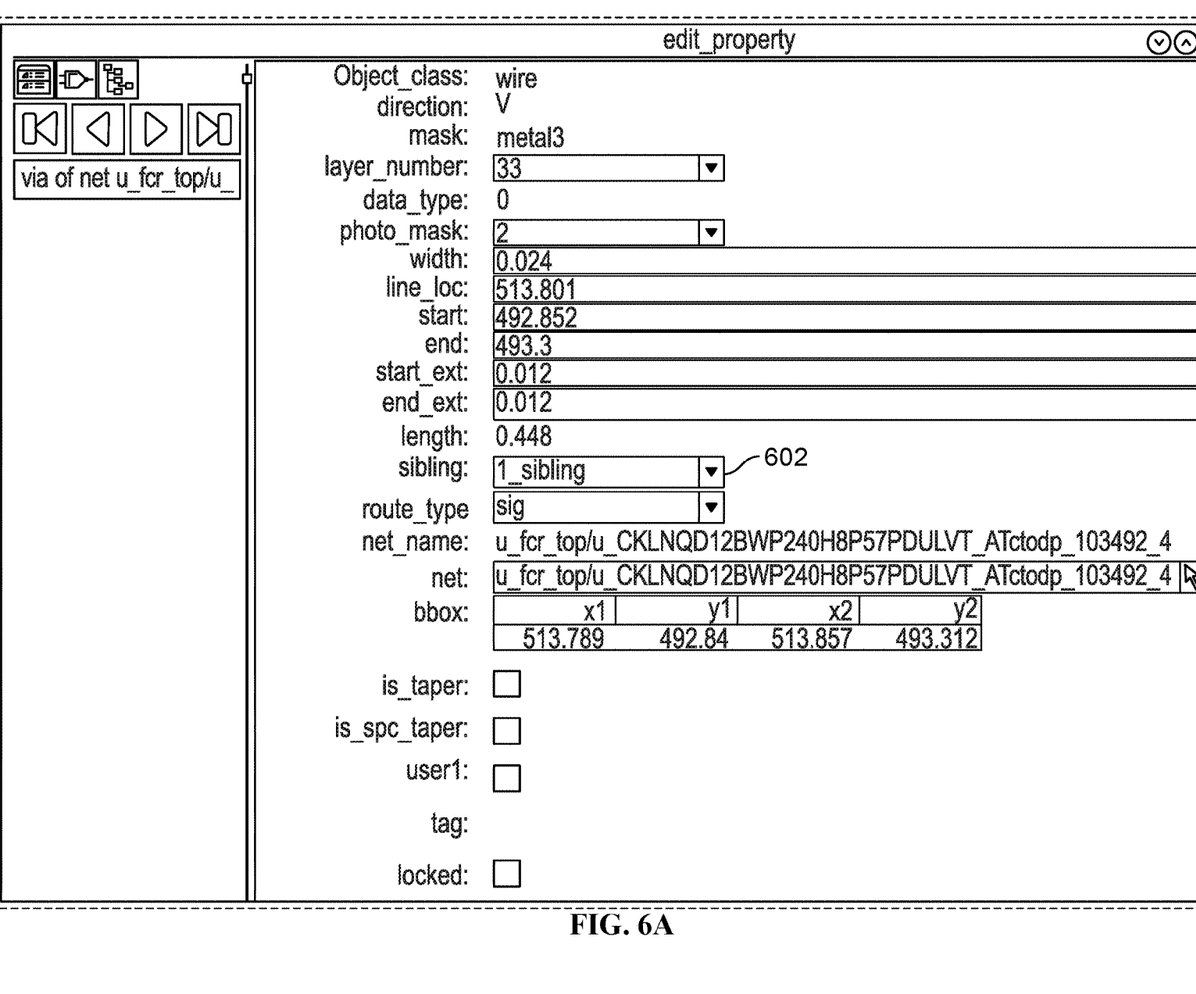
FIG. 6A is an example screenshot of a compacted representation of a wire.

FIG. 6A is an example screenshot of a compacted representation of a wire. In the example shown, an M3 metal wire is shown which would be eventually rendered into a rectangular polygon as it only has a two dimensional start, end, and width. In the example shown, the additional property required for this wire is a "sibling" property (602) which indicates "1_sibling" in the example, meaning one sibling wire will shadow the given wire. In one embodiment, a sibling property is stored in at least one of the following: a tag, a flag bit/nibble/byte, and a sibling bit/nibble/byte. Other possible values for this property (602) include "0_sibling" meaning no siblings, "2_sibling" meaning two additional parallel wires, and so on, for example "9_sibling" meaning nine additional parallel wires.

Figure 6B:
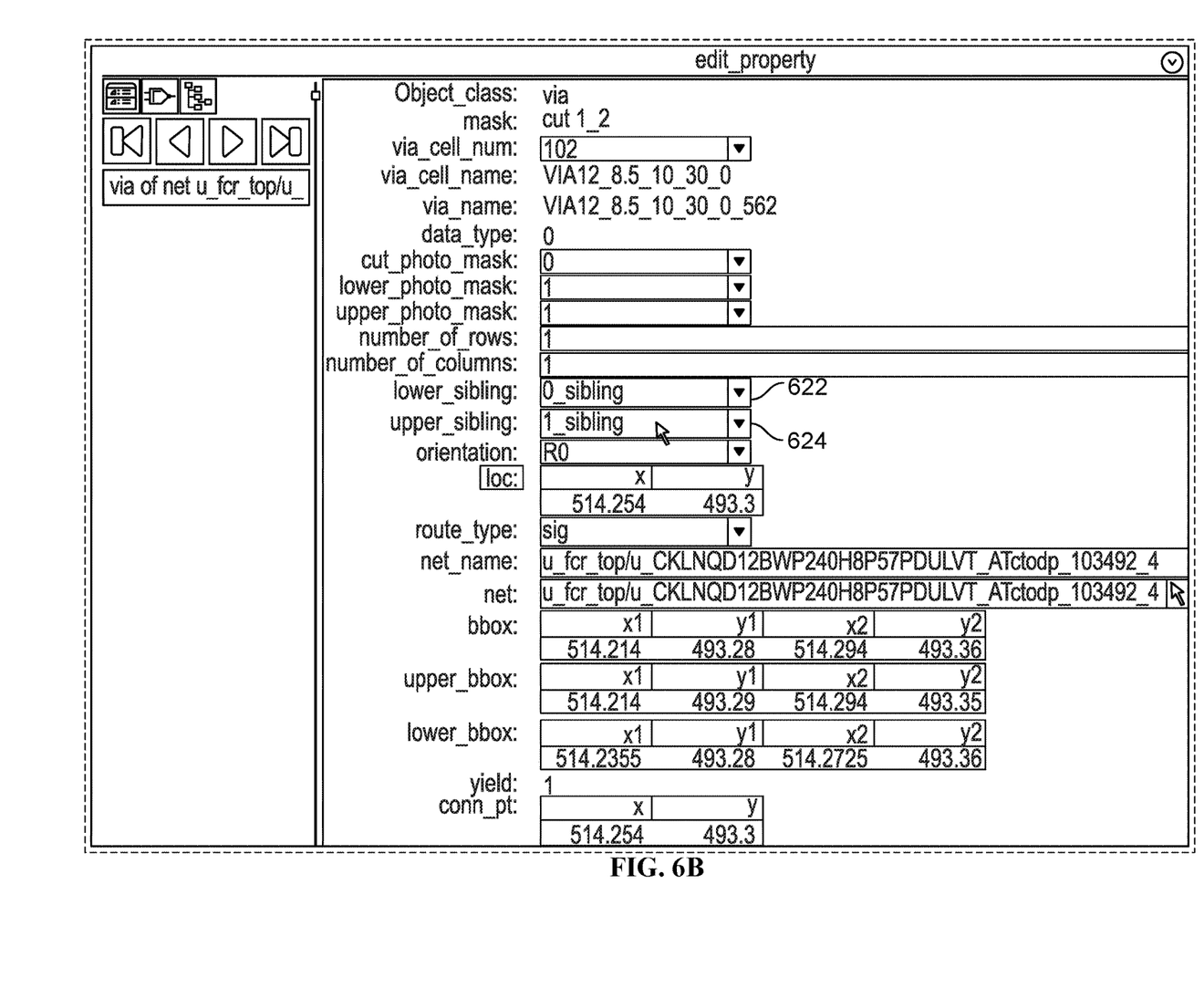
FIG. 6B is an example screenshot of a compacted representation of a via.

FIG. 6B is an example screenshot of a compacted representation of a via. In the example shown, a via is shown between layer 1 and 2 that would be eventually rendered as one or more vias. In the example shown, the two additional properties are an x-axis sibling/lower_sibling (622) and y-axis sibling/upper_sibling (624) which indicates "0_sibling" for lower_sibling and "1_sibling" for upper_sibling in the example shown, which may result in a 1×2 via similar to that shown in via (402) in FIG. 4B.

Figure 7:
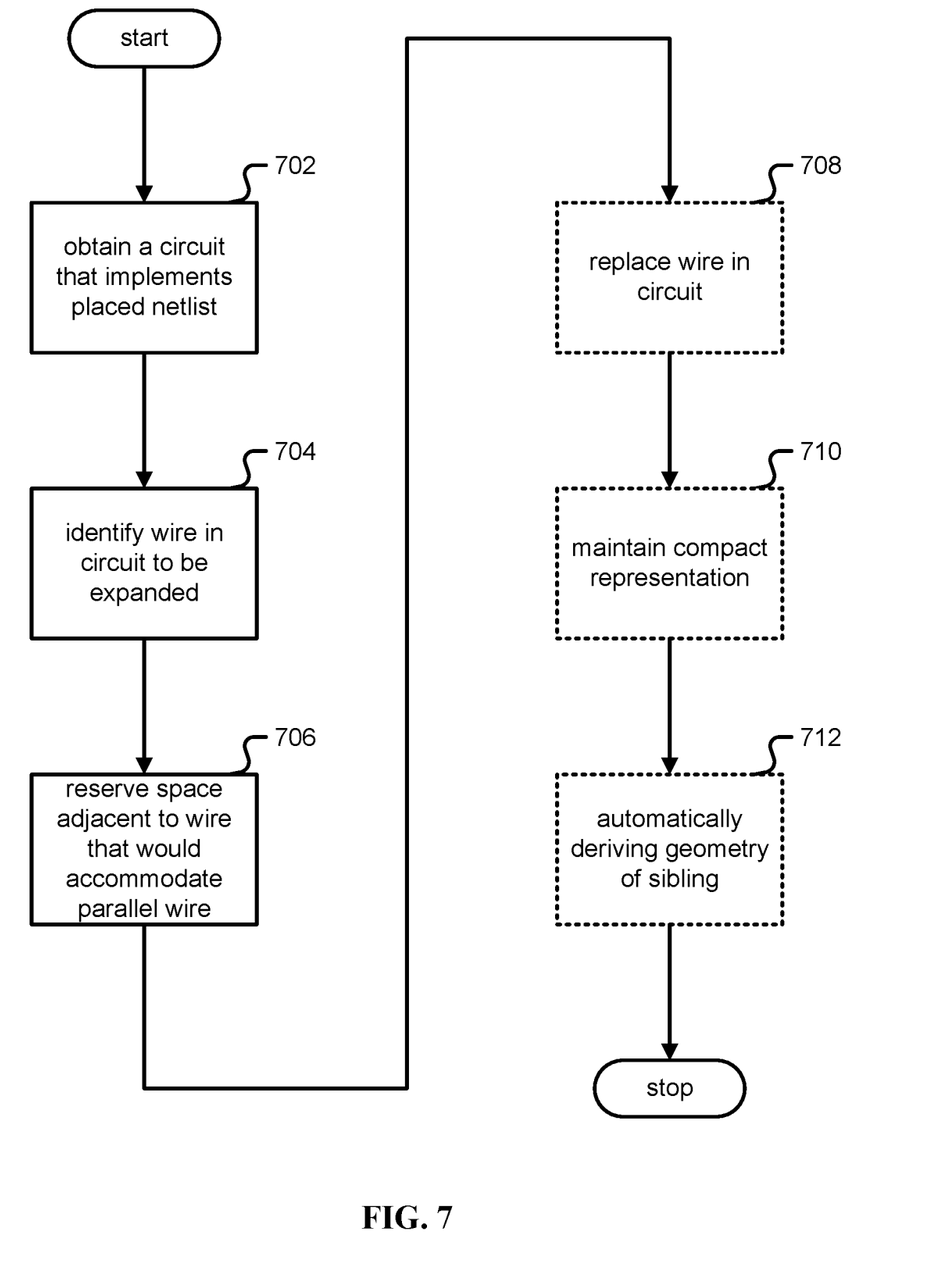
FIG. 7 is a flow chart illustrating an embodiment of a process for performing routing of a placed netlist.

FIG. 7 is a flow chart illustrating an embodiment of a process for performing routing of a placed netlist. In one embodiment, the flow of FIG. 7 is implemented by a system such as shown in FIG. 1 and/or one or more design tools. Optional steps (708), (710), and (712) are shown as optional using a dotted line.

In step (702), a circuit is obtained that implements a placed netlist. In one embodiment, the circuit comprises a specification of a physical wire. In step (704), a net is identified in the circuit that is to be enhanced. In one embodiment, identifying a net comprises identifying a net due to a timing specification not being met. In one embodiment, identifying a net comprises identifying a net due to a potential electromigration issue.

In step (706), space adjacent to a wire associated with the net that would accommodate a parallel wire is reserved. In one embodiment, availability of space to place a sibling wire is determined as well. In one embodiment, extra space to place a sibling wire is created. In one embodiment, another placement is iterated, in the event there is no space to place a sibling wire.

In optional step (708) the wire in the circuit is replaced with a plurality of parallel wires. In one embodiment, replacing the wire in the circuit with a plurality of parallel wires is at least in part to generate an improved circuit with reduced resistance. In one embodiment, a design rule check (DRC) is performed, wherein performing a DRC comprises creating a section that comprises the plurality of parallel wires. In one embodiment, a GDS file is output that includes the plurality of parallel wires.

In optional step (710), a compacted representation of the circuit is maintained as shown in FIG. 6A. Throughout this specification, "maintaining a compacted representation" includes using a compacted representation until a final rendering and/or derivation step to produce GDS and/or other polygon output, that is "just in time", to reduce computer memory requirements for the design tool and increase completion speed of the design process. In one embodiment, a compacted representation of the circuit requires less memory than representations of individual wires in the plurality of wires. In one embodiment, a compacted representation includes an indication that the wire includes a sibling. In one embodiment, the indication is at least one of the following: a tag, a flag bit, and a sibling bit. In one embodiment, a compacted representation of a via is maintained as shown in FIG. 6B. A compact representation of multiple wires or vias may be implemented in alternate ways as well without limitation, for example, instead of multiplying a thin wire, one may also divide a wide parent wire/via into multiple child wires/vias.

In optional step (712), geometry of a sibling is automatically derived or derived on the fly. In one embodiment, geometry includes at least one of the following: coordinates and connection.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor; and
a memory coupled with the processor, wherein the memory is configured to provide the processor with instructions which when executed cause the processor to:
perform routing of a placed netlist, comprising:
obtaining a circuit that implements the placed netlist;
identifying a net in the circuit that is to be enhanced;
reserving space adjacent to a selected wire associated with the net, wherein the space that is reserved would accommodate a parallel wire that is parallel to the selected wire, wherein the reserving of the space adjacent to the selected wire comprises:
determining availability of space to place a sibling wire to the selected wire, wherein the selected wire and the sibling wire are in the same direction;
replacing the selected wire with a plurality of parallel wires to generate another circuit with reduced resistance the plurality of parallel wires including a first parallel wire and a second parallel wire; and
maintaining a compacted representation of a via, comprising:
dividing the via into a plurality of child vias, wherein the plurality of child vias include a first child via and a second child via, wherein the first child via connects the first parallel wire with another wire in another layer, and wherein the second child via connects the second parallel wire with the other wire.

2. The system of claim 1, wherein the circuit comprises a specification of a physical wire.

3. The system of claim 1, wherein identifying a net comprises identifying a net due to a timing specification not being met.

4. The system of claim 1, wherein identifying a net comprises identifying a net due to a potential electromigration issue.

5. The system of claim 1, wherein the performing of the routing of the placed netlist further comprises performing a design rule check (DRC), wherein performing a DRC comprises creating a section that comprises the plurality of parallel wires.

6. The system of claim 1, wherein the performing of the routing of the placed netlist further comprises outputting a GDS file that includes the plurality of parallel wires.

7. The system of claim 1, wherein the performing of the routing of the placed netlist further comprises maintaining a compacted representation of multiple wires/vias in the circuit.

8. The system of claim 1, wherein the performing of the routing of the placed netlist further comprises maintaining a compacted representation of the circuit that requires less memory than representations of individual wires in the plurality of parallel wires.

9. The system of claim 8, wherein the compacted representation includes an indication that the selected wire includes a sibling.

10. The system of claim 9, wherein the indication is at least one of the following: a tag, a flag bit, and a sibling bit.

11. The system of claim 1, wherein the performing of the routing of the placed netlist further comprises automatically deriving geometry of a sibling.

12. The system of claim 11, wherein geometry is at least one of the following: coordinates and connection.

13. The system of claim 1, wherein the performing of the routing of the placed netlist further comprises creating extra space to place a sibling wire.

14. The system of claim 1, wherein the performing of the routing of the placed netlist further comprises iterating another placement in the event there is no space to place a sibling wire.

15. The system of claim 1, wherein at least one wire in a lower layer is narrower than at least one wire in a higher layer.

16. The system of claim 1, wherein the plurality of parallel wires are in the same layer.

17. A method, comprising:
routing a placed netlist, comprising:
obtaining a circuit that implements the placed netlist;
identifying a net in the circuit that is to be enhanced;
reserving space adjacent to a selected wire associated with the net, wherein the space that is reserved would accommodate a parallel wire that is parallel to the selected wire, wherein the reserving of the space adjacent to the selected wire comprises:
determining availability of space to place a sibling wire to the selected wire, wherein the selected wire and the sibling wire are in the same direction;
replacing the selected wire with a plurality of parallel wires to generate another circuit with reduced resistance, the plurality of parallel wires including a first parallel wire and a second parallel wire; and
performing place-and-route of the placed netlist, comprising:
maintaining a compacted representation of a via, comprising:
dividing the via into a plurality of child vias, wherein the plurality of child vias include a first child via and a second child via, wherein the first child via connects the first parallel wire with another wire in another layer, and wherein the second child via connects the second parallel wire with the other wire.

18. A computer program product, the computer program product being embodied in a non-transitory computer readable storage medium and comprising computer instructions for:
routing a placed netlist, comprising:
obtaining a circuit that implements the placed netlist;
identifying a net in the circuit that is to be enhanced;
reserving space adjacent to a selected wire associated with the net, wherein the space that is reserved would accommodate a parallel wire that is parallel to the selected wire, wherein the reserving of the space adjacent to the selected wire comprises:
determining availability of space to place a sibling wire to the selected wire, wherein the selected wire and the sibling wire are in the same direction;
replacing the selected wire with a plurality of parallel wires to generate another circuit with reduced resistance, the plurality of parallel wires including a first parallel wire and a second parallel wire; and
performing place-and-route of the placed netlist, comprising:
maintaining a compacted representation of a via, comprising:
dividing the via into a plurality of child vias, wherein the plurality of child vias include a first child via and a second child via, wherein the first child via connects the first parallel wire with another wire in another layer, and wherein the second child via connects the second parallel wire with the other wire.

* * * * *